Oct. 27, 1970 M. D. EASI 3,537,000
ELECTRICAL PROBE INCLUDING PIVOTABLE CONTACT ELEMENTS
Filed Sept. 20, 1967
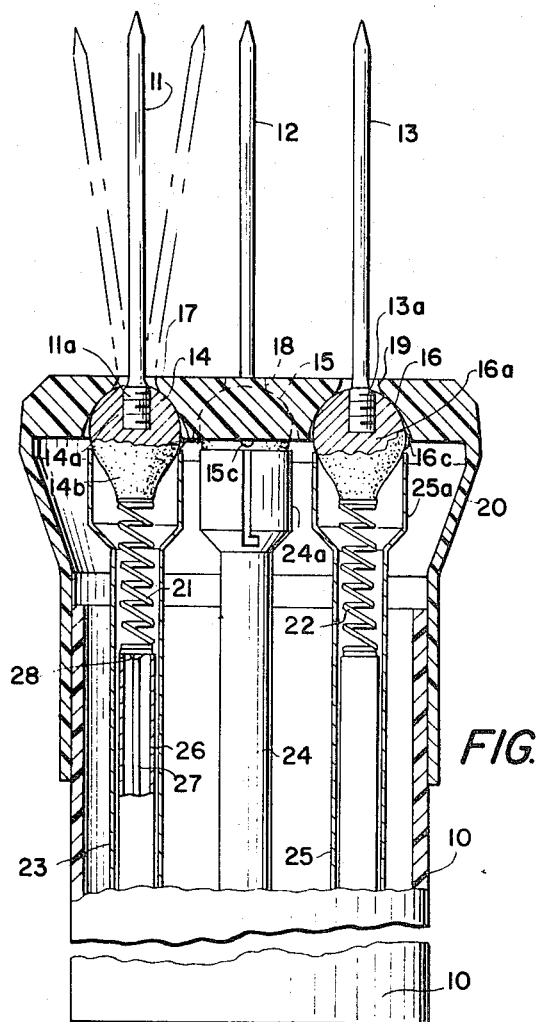
FIG. 1
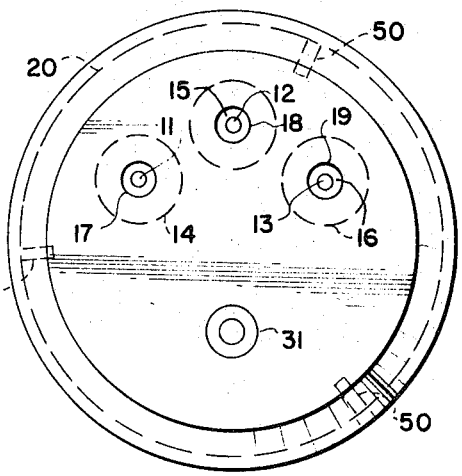
FIG. 2
FIG. 3a  FIG. 3b
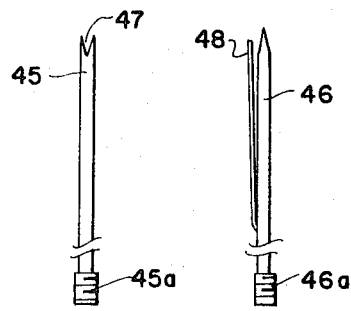
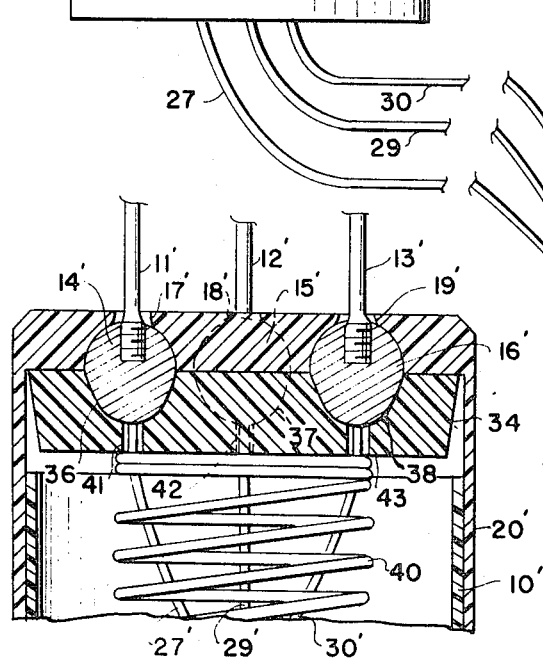
FIG. 4
INVENTOR
MICHAEL D. EASI
BY Larson and Taylor
ATTORNEYS

United States Patent Office 3,537,000
Patented Oct. 27, 1970

3,537,000
ELECTRICAL PROBE INCLUDING PIVOTABLE CONTACT ELEMENTS
Michael D. Easi, Philadelphia, Pa., assignor to VIMM Research Development Corporation, Philadelphia, Pa.
Filed Sept. 20, 1967, Ser. No. 669,127
Int. Cl. G01r 31/02
U.S. Cl. 324—72.5                            1 Claim

ABSTRACT OF THE DISCLOSURE

An electrical testing probe includes a plurality of laterally adjustable pivotedly mounted probe contact elements. The contact elements are spring supported to provide a controlled contact pressure. Individual probe contact elements may be removed or replaced with contact elements having different characteristics.

---

The present invention relates to electrical testing and more particularly to probes used in testing of electrical circuits.

Electrical circuits manufactured by soldering circuit elements to a printed circuit board present particular testing problems. For example, where the circuit to be tested includes transistors soldered to the board, it is, in general, impractical to unsolder the transistors to test them because first, the process is time-consuming and secondly, the transistors may be damaged or destroyed by the heat generated during the unsoldering or resoldering process and conducted through the transistors leads. Thus "in circuit" testing is generally preferable to testing wherein the individual elements are removed from the circuit board. Present in-circuit testing equipment is limited regarding testing time spent not so much by the type of metering used but rather by the method of connecting the meter to the circuit to be tested. For example, transistor test meters generally have three leads with clips on the ends away from the meter, which clips are to be attached to the separate leads on the transistor under test. Because the transistor itself is very small and space is inherently limited, testing under these circumstances is often very difficult if not impossible. Further this method provides for testing only on the component side of the printed board.

Even where test probes with contact elements for contacting the circuit test points are used, problems in testing still exist. For example, where only the back or "print" side of the circuit board is easily accessible, which is more often than not the case, testing must be accomplished through contacting the soldered connections presented on that side of the board with the testing probe contacts. Taking transistors again as an example, for conventional transistors there will be three drops or spots of solder on the circuit board corresponding to the three test terminals. For different sized transistors the distances between these solder spots will vary and thus the use of more than one test probe or of different sized test probes may be required. Where more than one probe is used both hands of the tester are occupied and thus one probe must be laid down before testing data can be recorded or metering adjustments can be made. Another problem encountered in circuit board testing is that of the possibility of breaking the very thin boards now in use. Pressure applied by the tester in order to achieve good contact may break the circuit board. Still another problem encountered is that the nature or type of contact point may make a good test contact difficult. For example, where the amount of solder on the different test connections varies and three or more test points are to be contacted it may occur that only the heavily soldered or raised connections will be contacted and the more flush connections will not and thus the test results obtained will be misleading or valueless. Further, certain test connections may have particular characteristics such as sharply pointed contact areas in the case of transformers and thus it may be difficult to make good contact with certain types of probe contact points, for example, with those which themselves are sharply pointed.

It is a primary object of the present invention to provide an improved electrical testing device.

It is a further object of the present invention to provide a single hand-held electrical test probe capable of making contact with test components of various sizes, having different numbers of test connections and having test connections of various arrangements and spacings.

It is an additional object of the present invention to provide an electrical test probe of the type described wherein the pressure applied by the probe contact elements is controlled.

It is still another object of the present invention to provide an electrical test probe which may be readily altered to enable the performance of specialized testing.

These and other objects not specifically enumerated are achieved through the provision of a test probe comprising a plurality of probe contact elements wherein the lateral spread between one element and another may be adjusted. In accordance with presently preferred embodiments of the invention the probe elements are pivotedly mounted in individual ball sockets in the probe body. In accordance with another feature of the invention the probe elements are individually spring biased to provide a controlled contact pressure. In accordance with another feature, various of the probe elements may be selectively removed or locked out of position to make certain tests wherein only a limited number of contact points are required to be contacted. In a further feature, specialized probe elements may be substituted for those normally used.

Other objects, features and advantages of the present invention will become apparent from the following detailed description, reference being made to the drawings wherein:

FIG. 1 is a front view, partially in section, of a presently preferred embodiment, FIG. 2 is a top view of the embodiment of FIG. 1, FIGS. 3a and 3b are representations of types of probe pins suitable for use with the present invention, FIG. 4 is a front view, partially in section, of a portion of another embodiment of the invention.

Referring to FIG. 1 a probe generally comprising a probe body 10 and a probe head 20 is shown. The probe head 20 is constructed of suitable insulating material and may be slidably fitted on the upper end of probe body 10. Locating members 50 (see FIG. 2) arranged on the inner surface of probe head 20 and received in slots (not shown) in the probe body 10 serve to position the head 20 with respect to the body 10. Probe body 10 is also constructed of insulating material and is of a length sufficient to permit it to be hand-held.

Contact with the circuit to be tested is made through elongated probe contact pins 11, 12 and 13 which extend outwardly of the upper surface of probe head 20. The contact pins 11 to 13 are constructed of conductive material and are pointed at the upper end thereof to ensure good contact as well as to ensure that contact can be made where only a very small portion of the contact treminal is exposed. As is shown in FIG. 2 probe pins 11 to 13 are arranged, in an arc, on the upper surface of probe head 20 together with a ground connection 31 also located thereon. The lead-in connections for ground connection 31 are not shown.

Spherical base members 14, 15 and 16, also of conductive material, are disposed within counter-sunk openings 17, 18 and 19 in the upper surface of probe head 20 and serve to mount the contact pins 11, 12 and 13. Spherical base members 14 to 16 form ball joints with counter-sunk openings 17 to 19, respectively.

Base members 14 to 16 may be provided with internal threads indicated at 14a and 16a to receive the threaded lower portions, indicated at 11a and 13a, of probe contact pins 11 and 13. It will be understood that the base members and contact pins can be of single piece construction but as will be described hereinafter greater testing flexibility is provided by making the pins removable. Each of the base members 14 to 16 are biased into contact with the inner surface of the probe head openings 17 to 19 through the action of individual biasing springs two of which, springs 21 and 22 for biasing base members 14 and 16, respectively are shown in FIG. 1. Base members 14 to 16 are further individually supported by insulating cylindrical support tubes 23, 24 and 25, respectively. It is noted that in practice support tubes 23 to 25 would be located very close together but have been shown spaced apart for purposes of clarity.

The construction of the support and connecting means is substantialy the same for each probe contact and only that for probe contact pin 11 will be discussed in detail. A second insulating cylindrical tube 26 is disposed concentrically within tube 23 and serves to support biasing spring 21. A lead-in wire 27 is soldered at 28 to the biasing spring 21 and is brought out of the bottom of the probe body 10 where it terminates in suitable connecting means (not shown) such as a clip for connecting probe contact pin 11 to appropriate testing or metering circuitry indicated by meter 52. The spring support tube 26 fits loosely about its associated lead-in wire 27 and is located within probe body 10 by the position of its associated tube 23. Tube 23 is supported between base member 14 and an insulating support (not shown) located at the bottom of probe body 10 and common to each of the support tubes 23 to 25. Base member 14 is provided with a downwardly extending portion 14b which serves to position the base member 14 with respect to biasing spring 21. Biasing spring 21 which is constructed of electrically conductive material surrounds portion 14b and bears against the lower surface of member 14 to make electrical contact therewith. Cylindrical support tube 23 is enlarged at the upper end thereof to accommodate base member 14 under circumstances where base member 14 is forced downwardly against the biasing action of spring 21. These circumstances will be described hereinafter. The upper edge of the enlarged portion of support tube 23 serves to provide loose support for as well as to position associated base member 14. The tube 23 is sufficiently flexible to permit the base member to be forced down into the enlarged end portion thereof. The transition section between the normal and enlarged diameters of support tube 23 provides a stop for the downward motion of base member 14. It is noted that this stop could be provided in a number of ways. For example, the spring 21 in its fully compressed state will limit the travel of base member 14 as will the relative location of cylindrical spring support tube 26. It will be understood that support and connecting elements similar to elements 26 to 28 are provided for probe contact elements 12 and 13. Meter leads 29 and 30 for probe elements 12 and 13 extend outwardly from the bottom of probe body 10.

By providing a ball joint support for each of the probe contact pins 11 to 13 lateral positions of the contact pins may be adjusted. Two possible further positions for contact pin 11 are indicated by dotted lines in FIG. 1. As was pointed out hereinbefore the different sizes of various transistors are reflected on the reverse side of the printed circuit board in connections of different spacings. For example, the triangle formed by three spots of solder corresponding to the three terminal connections for a given transistor may be only one-third of the size of the triangle formed by the soldered connections corresponding to a different size transistor. The device of the present invention permits pivoting of the probe contact pins 11 to 13 so that transistors of all sizes may be measured at a single setting of the contact pins. The largest size transistor which may be tested in this manner is, of course, limited by the length of the probe contact pins and by the degree of freedom of rotation provided for the spherical base members 14 to 16 but these parameters may be varied to provide a probe capable of measuring the largest size transistor likely to be encountered.

The biasing springs (springs 21 and 22 only being shown) provide a controlled pressure on the circuit board and thus aid in preventing cracking of the relatively thin boards now in use. Rigidly fixed probe contacts if pressed sufficiently hard against the circuit board may cause such cracking. The biasing springs also provide additional flexibility in testing in that the soldered connections on the circuit board may be built-up to substantially different heights from the board and thus it may occur with rigidly fixed probe contact elements that two of the contact elements make contact with heightened soldered connections while a third pin fails to make contact because of the reduced height of the soldered connection opposite it. The provision of biasing springs permits contact to be made with soldered connections of varying heights.

Additional flexibility in testing is provided by making pins 11 to 13 removable. First, for testing operations involving only two test circuit contact points it may be advisable to remove one of the pins to guard against a false indication resulting from inadvertent contact of that pin with an active part of the circuit. For example, in the measurement of the voltage across a resistor pin 13 may be removed and pins 11 and 12 used to contact the resistor terminals. Regarding other advantages of making pins 11, 12 and 13 removable it is noted that for some testing operations it may be desirable to use probe contact pins having different characteristics from those shown in FIG. 1. For example, in the testing of transformers, the transformer testing terminals may be constructed in the form of pins and thus a probe pin such as that shown in FIG. 3a may be better suited for making contact. Pin 45 of FIG. 3a has a recess 47 located in the end thereof for receiving a pin type terminal and is threaded as is indicated by reference character 45a so as to permit pin 45 to be screwed into any of the base members 14 to 16. Pin 46 of FIG. 3b shows another tool useable where the terminal itself is inaccessible but a wire leading from the terminal can be contacted. A wire member 48 secured in a slot (not shown) in pin member 46 together with the body of pin 46 form a clip for clipping pin 46 to the wire to be contacted. In operation the test wire is forced between the probe wire 48 and probe body 46. Pin 46 is also supplied with suitable threading 46a for mounting the pin into any of base members 14 to 16.

Where the pin and base members are of one piece construction, it is possible in accordance with another feature of the invention to lock one or more of the pins out of the way of the pins to be used. In accordance with the invention a protuberance or nose provided on a base member is positioned in a L-shaped slot in a cylindrical support tube. In FIG. 1, nose 15c on base member 15 is positioned above slot 24a while nose 16c on base member 16 is positioned above slot 25a in tube 25. Using pin 12 as an example, by forcing pin 12 downwardly against the biasing action of its biasing spring (not shown) until nose 15c reaches the end of the straight vertical portion of the L-shaped slot 24a and then rotating the pin about its longitudinal axis so as to move nose 15c into the horizontal portion of slot 24a, pin 12 may be locked in a position where the contact point thereof will not interfere with measurements made with the other two contact pins 11 and 13.

Referring to FIG. 4, an alternate embodiment of the present invention is shown and elements corresponding to those shown in FIGS. 1 and 2 are given the same numerals with primes attached. The principal difference between the embodiment of FIG. 4 and the embodiment of FIGS. 1 and 2 is that a different form of support is provided for base members 14' to 16' of FIG. 3. In FIG. 4 support is provided through two elements, a substantially cylindrical support member 34 and a single compression spring 40. Support member 34 includes a number of semi-spherical recesses 36, 37 and 38 used to seat base members 14' to 16'. Compression spring 40 forces support member 34 against the lower surface of probe head 20' so that counter-sunk openings 17' to 19' and corresponding semi-spherical recesses 36 to 38 together form substantially spherical hollows in the upper end of the probe. Base members 14' to 16' may be pivoted in these spherical hollows and the spread between the pins 11' to 13' may be thereby adjusted. The lower surface of support member 34 includes openings 41, 42 and 43 which permit leads 27', 29' and 30' to be brought into contact with base members 14', 15' and 16', respectively. Biasing spring 40 provides a controlled pressure for pins 11' to 13'.

Other forms of support for the probe contact pins may be used. For example, in FIG. 4 spring 40 may be replaced by a setscrew (not shown) located in a bore of a single hand-held probe. In use, the probe pins 11 to 13 hole between probe head 20' and support member 34. Adjustment of such a setscrew would then control the rigidity of the positions of pins 11' to 13'. Another form the invention might take could comprise forming support member 34 as a single piece with probe body 10'. Probe body 10' could be threaded on the outer surface at the upper end thereof to receive correspondingly threaded probe head 20'. Screwing of head 20' onto body 10' would thus control the rigidity of the positioning of probe pins 11' to 13'. It may also be desired to replace the coil spring 40 of FIG. 3 with a C-spring or leaf spring which in general may be less expensive and require less space.

One of the principal advantages of the present invention is that testing may be accomplished through the use of a single hand-held probe. In use, the probe pins 11 to 13 are individually placed on the appropriate test points, using two hands where necessary, and when the probe pins are in position the probe may be held with one hand. In this way the other hand is freed for other duties such as adjustment of associated meters or recording test results.

Although three probe elements have been illustrated and are preferred for use in transistor measurement, any number of probe elements may be used. Further, it will be understood that the probe of the invention may be used in measuring and testing of electrical circuits other than printed circuits.

It will be understood by those skilled in the art that the embodiments of the invention shown and described herein are subject to other modification without departing from the scope and spirit of the invention. Accordingly, it should be understood that the invention is not limited by the embodiments shown and described, but rather is defined by the subjoined claim.

Having described my invention in the manner required by the patent statutes, I claim:

1. An electrical testing device comprising a body member, a plurality of spaced, pivotably mounted, laterally adjustable contact elements extending outwardly of said body member for contacting a test element, and connecting means for connecting said contact elements to testing means, said contact elements each comprising a substantially spherical base member for mounting the element and an elongate pin-like contact member for contacting a test element, said body member including a like plurality of counter-sunk openings, each of said spherical base members being located partially within an associated said counter-sunk opening and said elongate contact members extending outwardly through said counter-sunk openings, said device further comprising a like plurality of springs for individually supporting said base members and for biasing said base members into contact with the portions of said body member defining said counter-sunk openings, a first like plurality of insulating cylinders for supporting said springs, and a second like plurality of insulating cylinders concentric with said first cylinders for locating and supporting said base members, said second plurality of cylinders being enlarged at one end thereof to receive said base members when said base members are forced inwardly of said body member against the biasing action of said springs.

References Cited

UNITED STATES PATENTS

| | | | |
|---|---|---|---|
| 2,894,205 | 7/1959 | Schrock | 324—72.5 |
| 3,265,969 | 8/1966 | Catu | 324—72.5 |
| 3,445,766 | 5/1969 | Valliere | 324—72.5 |
| 1,650,779 | 11/1927 | Williams. | |
| 1,886,489 | 11/1932 | Ludwig | 324—72.5 XR |
| 2,020,088 | 11/1935 | Truswell | 339—7 |
| 2,969,519 | 1/1961 | Thomas | 324—72.5 XR |
| 3,201,746 | 8/1965 | Askew | 339—108 |

FOREIGN PATENTS

| | |
|---|---|
| 266,247 | Italy. |
| 339,288 | Italy. |

RUDOLPH V. ROLINEC, Primary Examiner

E. L. STOLARUN, Assistant Examiner

U.S. Cl. X.R.

339—108